United States Patent
Zhang et al.

(10) Patent No.: US 10,229,509 B2
(45) Date of Patent: *Mar. 12, 2019

(54) METHODS AND SYSTEMS FOR AUTOMATIC FULLNESS ESTIMATION OF CONTAINERS

(71) Applicant: SYMBOL TECHNOLOGIES, LLC, Lincolnshire, IL (US)

(72) Inventors: Yan Zhang, Buffalo Grove, IL (US); Jay Williams, Glenview, IL (US); Kevin J. O'Connell, Palatine, IL (US); Cuneyt M. Taskiran, Chicago, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,526

(22) Filed: Feb. 27, 2018

(65) Prior Publication Data

US 2018/0189967 A1 Jul. 5, 2018

Related U.S. Application Data

(63) Continuation of application No. 14/944,860, filed on Nov. 18, 2015, now Pat. No. 9,940,730.

(51) Int. Cl.
  *G06T 7/50* (2017.01)
  *G06T 7/62* (2017.01)

(52) U.S. Cl.
  CPC ............. *G06T 7/50* (2017.01); *G06T 7/62* (2017.01); *G06T 2207/10012* (2013.01); *G06T 2207/10028* (2013.01)

(58) Field of Classification Search
  None
  See application file for complete search history.

(56) References Cited

U.S. PATENT DOCUMENTS

| 4,408,782 A | 10/1983 | Condon |
| 5,430,831 A | 7/1995 | Snellen |

(Continued)

FOREIGN PATENT DOCUMENTS

| DE | 10050385 A1 | 4/2002 |
| EP | 2178035 A1 | 4/2010 |

(Continued)

OTHER PUBLICATIONS

Simulate point clouds of packages loaded in trailers: http://bl.ocks.org.michael-groble/4588547, Jan. 21, 2013.

(Continued)

*Primary Examiner* — Chan Park
*Assistant Examiner* — Elisa Rice
(74) *Attorney, Agent, or Firm* — Yuri Astvatsaturov

(57) ABSTRACT

A method and apparatus for (a) receiving a three-dimensional (3D) point cloud from a depth sensor that is oriented towards an open end of a shipping container, the point cloud comprising a plurality of points that each have a respective depth value, (b) segmenting the received 3D point cloud among a plurality of grid elements, (c) calculating a respective loaded-container-portion grid-element volume for each grid element, (d) calculating a loaded-container-portion volume of the shipping container by aggregating the calculated respective loaded-container-portion grid-element volumes, (e) calculating an estimated fullness of the shipping container based on the loaded-container-portion volume and a capacity of the shipping container; and (f) outputting the calculated estimated fullness of the shipping container.

20 Claims, 5 Drawing Sheets

(56) References Cited

U.S. PATENT DOCUMENTS

| | | | |
|---|---|---|---|
| 5,474,083 | A | 12/1995 | Church et al. |
| 6,269,175 | B1 | 7/2001 | Hanna et al. |
| 6,332,098 | B2 | 12/2001 | Ross et al. |
| 6,744,436 | B1 | 6/2004 | Chirieleison, Jr. et al. |
| 7,455,621 | B1 | 11/2008 | Anthony |
| 7,667,596 | B2 | 2/2010 | Ozdemir et al. |
| 7,961,910 | B2 | 6/2011 | Lee et al. |
| 8,269,616 | B2 | 9/2012 | Uehara |
| 8,346,056 | B2 | 1/2013 | M |
| 9,460,524 | B1 | 10/2016 | Curlander et al. |
| 9,940,730 | B2 | 4/2018 | Zhang et al. |
| 2002/0150294 | A1 | 10/2002 | Cave et al. |
| 2003/0036935 | A1 | 2/2003 | Nel |
| 2004/0066500 | A1* | 4/2004 | Gokturk ............... G01C 11/30 356/4.01 |
| 2004/0125217 | A1 | 7/2004 | Jesson et al. |
| 2005/0199782 | A1 | 9/2005 | Calver et al. |
| 2006/0056679 | A1 | 3/2006 | Redert et al. |
| 2006/0061566 | A1* | 3/2006 | Verma ..................... G06T 17/00 345/419 |
| 2006/0239558 | A1 | 10/2006 | Rafii et al. |
| 2007/0016538 | A1 | 1/2007 | Bielefeld et al. |
| 2007/0025593 | A1 | 2/2007 | Haupt et al. |
| 2007/0075853 | A1 | 4/2007 | Griffin et al. |
| 2007/0297560 | A1 | 12/2007 | Song et al. |
| 2008/0025565 | A1 | 1/2008 | Zhang et al. |
| 2008/0042865 | A1 | 2/2008 | Shephard et al. |
| 2008/0201116 | A1 | 8/2008 | Ozdemir et al. |
| 2008/0204225 | A1 | 8/2008 | Kitchen |
| 2008/0303897 | A1 | 12/2008 | Twitchell, Jr. |
| 2009/0121017 | A1 | 5/2009 | Cato et al. |
| 2009/0135009 | A1 | 5/2009 | Little et al. |
| 2010/0073476 | A1* | 3/2010 | Liang .................... G06Q 10/08 348/136 |
| 2010/0110185 | A1 | 5/2010 | Tafazoli Bilandi et al. |
| 2010/0161170 | A1 | 6/2010 | Siris |
| 2010/0213313 | A1 | 8/2010 | Reed et al. |
| 2010/0268675 | A1 | 10/2010 | Baldes et al. |
| 2011/0264303 | A1 | 10/2011 | Lenser et al. |
| 2012/0155743 | A1 | 6/2012 | Kim |
| 2012/0163723 | A1 | 6/2012 | Balan et al. |
| 2012/0243774 | A1 | 9/2012 | Chen et al. |
| 2012/0283868 | A1 | 11/2012 | Rutt et al. |
| 2013/0136338 | A1 | 5/2013 | Asente et al. |
| 2013/0293539 | A1 | 11/2013 | Hunt et al. |
| 2013/0342653 | A1 | 12/2013 | McCloskey et al. |
| 2014/0055560 | A1 | 2/2014 | Fu et al. |
| 2014/0123606 | A1 | 5/2014 | Ehrat |
| 2014/0247261 | A1 | 9/2014 | Lenser et al. |
| 2014/0350719 | A1 | 11/2014 | Fleischmann et al. |
| 2014/0372182 | A1 | 12/2014 | Groble et al. |
| 2014/0372183 | A1 | 12/2014 | Groble et al. |
| 2015/0170256 | A1 | 6/2015 | Pettyjohn et al. |
| 2015/0248765 | A1 | 9/2015 | Criminisi et al. |
| 2015/0332075 | A1 | 11/2015 | Burch |
| 2016/0238374 | A1 | 8/2016 | Burch, V et al. |
| 2016/0238425 | A1 | 8/2016 | Burch, V et al. |
| 2016/0239790 | A1 | 8/2016 | Burch, V et al. |
| 2016/0239791 | A1 | 8/2016 | Burch, V et al. |
| 2016/0239792 | A1 | 8/2016 | Burch, V et al. |
| 2016/0239795 | A1 | 8/2016 | Burch, V et al. |
| 2016/0239799 | A1 | 8/2016 | Burch, V et al. |
| 2016/0239801 | A1 | 8/2016 | Burch, V et al. |
| 2016/0239802 | A1 | 8/2016 | Burch, V et al. |

FOREIGN PATENT DOCUMENTS

| | | |
|---|---|---|
| EP | 2302564 A1 | 3/2011 |
| GB | 1010162 A | 11/1965 |

OTHER PUBLICATIONS

Mang et al., U.S. Appl. No. 14/978,367, filed Dec. 22, 2015.

International Search Report & Written Opinion for corresponding International Patent Application No. PCT/US2016/061279 dated Apr. 4, 2017.

Extended Search Report for European Patent Application No. 14737390.6 dated Oct. 24, 2017.

* cited by examiner

METHODS AND SYSTEMS FOR AUTOMATIC FULLNESS ESTIMATION OF CONTAINERS

CROSS-REFERENCE TO RELATED APPLICATIONS

This application is a continuation of U.S. application Ser. No. 14/944,860, filed Nov. 18, 2015, entitled "Methods and Systems For Automatic Fullness Estimation of Containers," which is incorporated by reference herein in its entirety.

BACKGROUND OF THE INVENTION

Efficient loading of containers is a key element to successful distribution in the transportation and logistics industry. Ensuring that each container is loaded efficiently throughout the loading process is vital to successful distribution. However, the inability to verify that each container meets this goal has been a problem in the industry.

There is a need for real-time monitoring or measurements of the containers during the loading process. This functionality could provide good business value to vendors through loading optimization.

Accordingly, there is a need for methods and systems for automatic fullness estimation of containers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
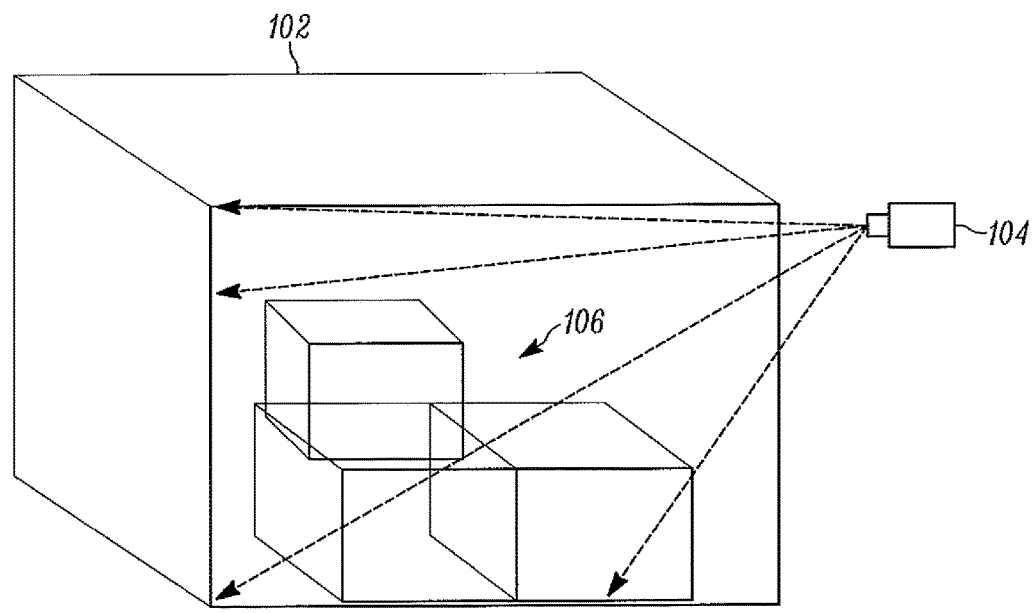
FIG. 1 depicts a shipping container, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment takes the form of a process that includes (a) receiving a three-dimensional (3D) point cloud from a depth sensor that is oriented towards an open end of a shipping container, where the point cloud includes a plurality of points that each have a respective depth value, (b) segmenting the received 3D point cloud among a plurality of grid elements, (c) calculating a respective loaded-container-portion grid-element volume for each grid element, (d) calculating a loaded-container-portion volume of the shipping container by aggregating the calculated respective loaded-container-portion grid-element volumes, (e) calculating an estimated fullness of the shipping container based on the loaded-container-portion volume and a capacity of the shipping container; and (f) outputting the calculated estimated fullness of the shipping container.

A second embodiment takes the form of a system that includes a depth sensor, a communication interface, a processor, a data storage containing instructions executable by the processor for causing he system to carry out at least the functions described in the preceding paragraph.

In at least one embodiment, the plurality of grid elements collectively forms a two-dimensional (2D) grid image that corresponds to a plane that is parallel to the open end of the shipping container, where each grid element has a respective grid-element area, and the method further includes determining a respective loaded-container-portion grid-element depth value for each grid element, where calculating the respective loaded-container-portion grid-element volume for each grid element is based on at least the respective grid-element area and the respective loaded-container-portion grid-element depth value for each respective grid element.

In at least one embodiment, the method further includes determining an unloaded-container-portion depth value for each grid element, and determining a respective loaded-container-portion grid-element depth value for each grid element is based at least in part on the difference between (i) a depth dimension of the shipping container and (ii) the determined unloaded-container-portion depth value for the corresponding grid element.

In at least one embodiment, assigning the grid-element depth value for the given grid element based on the depth values of the points in the point cloud that correspond to the given grid element includes assigning as the grid-element depth value for the given grid element a minimum value from among the depth values of the points in the point cloud that correspond to the given grid element.

In at least one embodiment, assigning the grid-element depth value for the given grid element based on the depth values of the points in the point cloud that correspond to the given grid element includes assigning as the grid-element depth value for the given grid element an average value of the depth values of the points in the point cloud that correspond to the given grid element.

In at least one embodiment, the depth dimension of the shipping container is a grid-element-specific depth dimension that is based on a corresponding grid element in a reference empty-container point cloud. In at least one such embodiment, the reference empty-container point cloud reflects a back wall of the shipping container being a flat surface. In at least one other such embodiment, the reference empty-container point cloud reflects a back wall of the shipping container being a curved surface.

In at least one embodiment, the method further includes cleaning up the 2D grid image prior to determining a respective loaded-container-portion grid-element depth value for each grid element.

In at least one embodiment, the depth sensor has an optical axis and an image plane, and the method further includes, prior to segmenting the received point cloud among the plurality of grid elements, rotating the received 3D point cloud to align (i) the optical axis with a ground level and (ii) the image plane with an end plane of the shipping container.

In at least one embodiment, rotating the point cloud is based on an offline calibration process using the ground level and the end plane as reference.

In at least one embodiment, the method further includes determining the capacity of the shipping container based at least in part on the received 3D point cloud.

In at least one embodiment, the method further includes (i) receiving an optical image of the shipping container and (ii) determining the capacity of the shipping container based at least in part on the received optical image. In at least one such embodiment, determining the capacity of the shipping container based at least in part on the received optical image includes (i) determining at least one physical dimension of the shipping container from the received optical image and (ii) determining the capacity of the shipping container based on the at least one determined physical dimension. In at least one other such embodiment, determining the capacity of the shipping container based at least in part on the received optical image includes (i) using optical character recognition (OCR) on the at least one received optical image to ascertain at least one identifier of the shipping container and (ii) using the at least one ascertained identifier of the shipping container to determine the capacity of the shipping container.

In at least one embodiment, each grid element has sides substantially equal to 5 millimeters (mm) in length.

In at least one embodiment, each grid element is substantially square in shape, and a grid-element side length is an adjustable parameter.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts a shipping container, in accordance with some embodiments. In particular, FIG. 1 depicts (i) a shipping container 102 and (ii) a depth sensor 104 that is oriented towards an open end of the shipping container 102. In various different examples, the shipping container 102 could be designed for travel by truck, rail, boat, plane, and/or any other suitable mode or modes of travel. Moreover, as is more fully discussed herein, the shipping container 102 could have any of a number of different shapes; a substantially rectangular shape (i.e., a rectangular cylinder) is depicted by way of example in FIG. 1. As depicted in FIG. 1, the shipping container 102 contains objects (e.g., boxes and/or other packages) 106. The shipping container 102 may have a number of different surfaces, perhaps flat, perhaps curved, among numerous other possibilities that could be listed here.

There are a number of types of depth sensor 104 that could be used, perhaps one that includes an RGB sensor, perhaps leap motion, perhaps Intel perceptual computing, perhaps Microsoft Kinect, among numerous other possibilities that could be listed here. There are also a number of depth-sensing techniques that could be implemented by the depth sensor 104, perhaps using stereo triangulation, perhaps using time of flight, perhaps using coded aperture, among numerous other possibilities that could be listed here. As one example, the depth sensor 104 could be mounted to a wall or column or the like in a given shipping warehouse, and the shipping container 102 could be positioned on the back of a truck, and then driven (e.g., backed) into a position such that the depth sensor 104 is oriented towards an open end of the shipping container 102, as is depicted in FIG. 1.

Figure 2A:
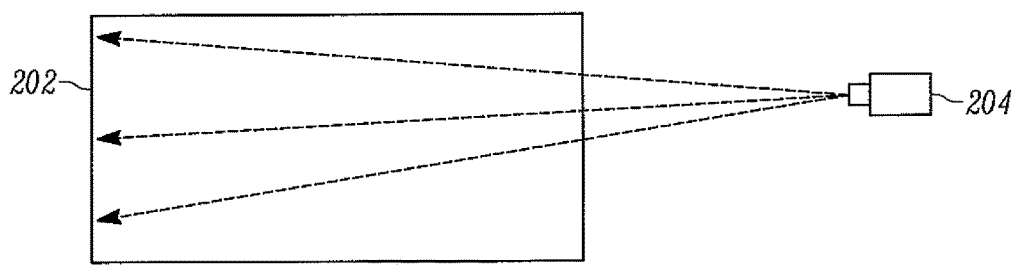
FIG. 2A depicts a flat back surface of a shipping container, accordance with some embodiments.
Figure 2B:
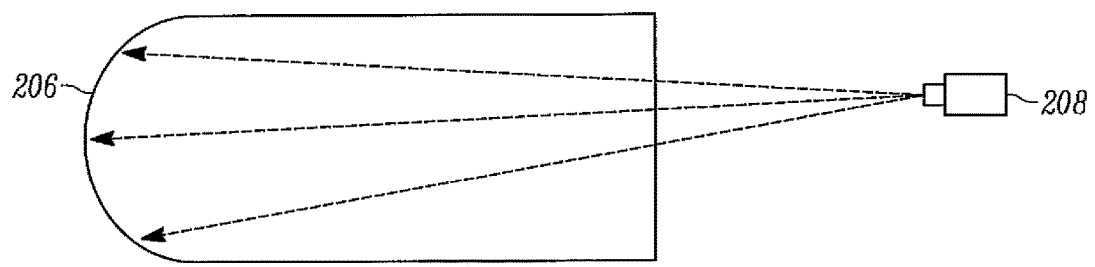
FIG. 2B depicts a curved back surface of a shipping container, in accordance with some embodiments.

As mentioned above, different shipping containers could have different shapes. Two examples are shown in FIGS. 2A and 2B. In particular, FIG. 2A depicts (i) a flat back wall (i.e., surface) 202 of a shipping container and (ii) a depth sensor 204, whereas FIG. 2B depicts (i) a curved back wall (i.e., surface) 206 of a shipping container and (ii) a depth sensor 208. And certainly numerous other examples of shipping-container shapes could be presented here.

Figure 3:
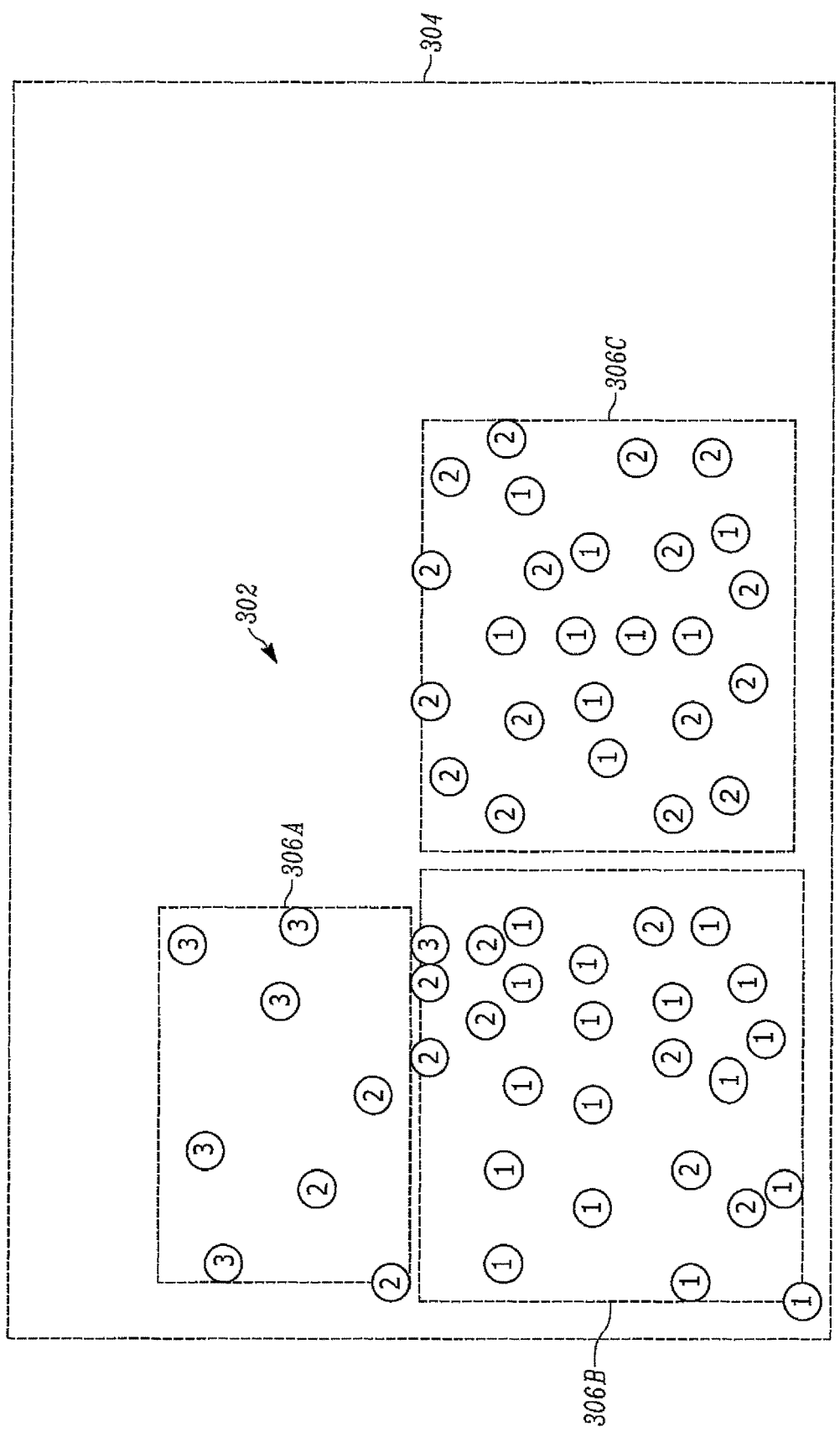
FIG. 3 depicts a loaded-container point cloud, in accordance with some embodiments.

FIG. 3 depicts a loaded-container point cloud, in accordance with some embodiments. In particular, FIG. 3 depicts a 3D point cloud 302. As a general matter, the depth sensor that is oriented at the open end of the shipping container may gather depth information in a given field of view and transmit that information to a system that may be equipped, programmed, and configured to carry out the present systems and methods. That set of information (i.e., points) is referred to herein as being a 3D point cloud (or at times simply a point cloud); each point in such a cloud corresponds to a perceived depth at a corresponding point in the field of view of the depth sensor.

Returning to FIG. 3, an outline 304 of a shipping container is shown, as are outlines 306A, 306B, and 306C of example packages in the example shipping container. These outlines 304 and 306A-C are intended to generally correspond to the shipping container 104 and the packages 106 that are depicted in FIG. 1, in order to help the reader visualize an example real-world scenario from which the example point cloud 302 could have been derived, gathered, or the like. Moreover, for purposes of illustration, each point in the point cloud 302 is shown in FIG. 3 as having an integer number that corresponds to an example depth value (in, e.g., example units such as meters). In actual implementations, any number of points could be present in the point cloud 302, as the various points that are depicted in FIG. 3 as being part of the point cloud 302 are for illustration and are not meant to be comprehensive.

Moreover, as is more fully discussed below, in some embodiments the depth sensor that is oriented towards an open end of the shipping container has a vantage point with respect to the open end of the shipping container that is not aligned with the center of the open end of the shipping container in one or more dimensions. That is, the depth sensor and the shipping container might be relatively positioned such that the depth sensor is looking to some extent from one side or the other and could be vertically off center (e.g., elevated) as well. So, for example, the depth sensor may be positioned higher and to the right of the center of the plane that corresponds with the open end of the shipping container.

As is more fully described below, the present disclosure includes segmentation of the received point cloud into a number of grid elements that collectively correspond to the open end of the shipping container. In cases where the depth sensor happens to be positioned square to the open end of the shipping container and vertically centered on that open end as well, this segmentation step can be proceeded to without first performing one or more geometric rotations and/or projections. In other cases, however, prior to carrying out the below-described segmentation step and the various other steps that are subsequent to that, the present systems and methods include a step of projecting the received point cloud on to a two-dimensional (2D) grid that corresponds to the open end of the shipping container using one or more geometric rotations and/or projections in accordance with the relative positions of the depth sensor and the open end of the shipping container. Such relative position can be pre-programmed into the system, or could otherwise be determined using depth sensors, optical cameras, and/or other suitable equipment.

Figure 4:
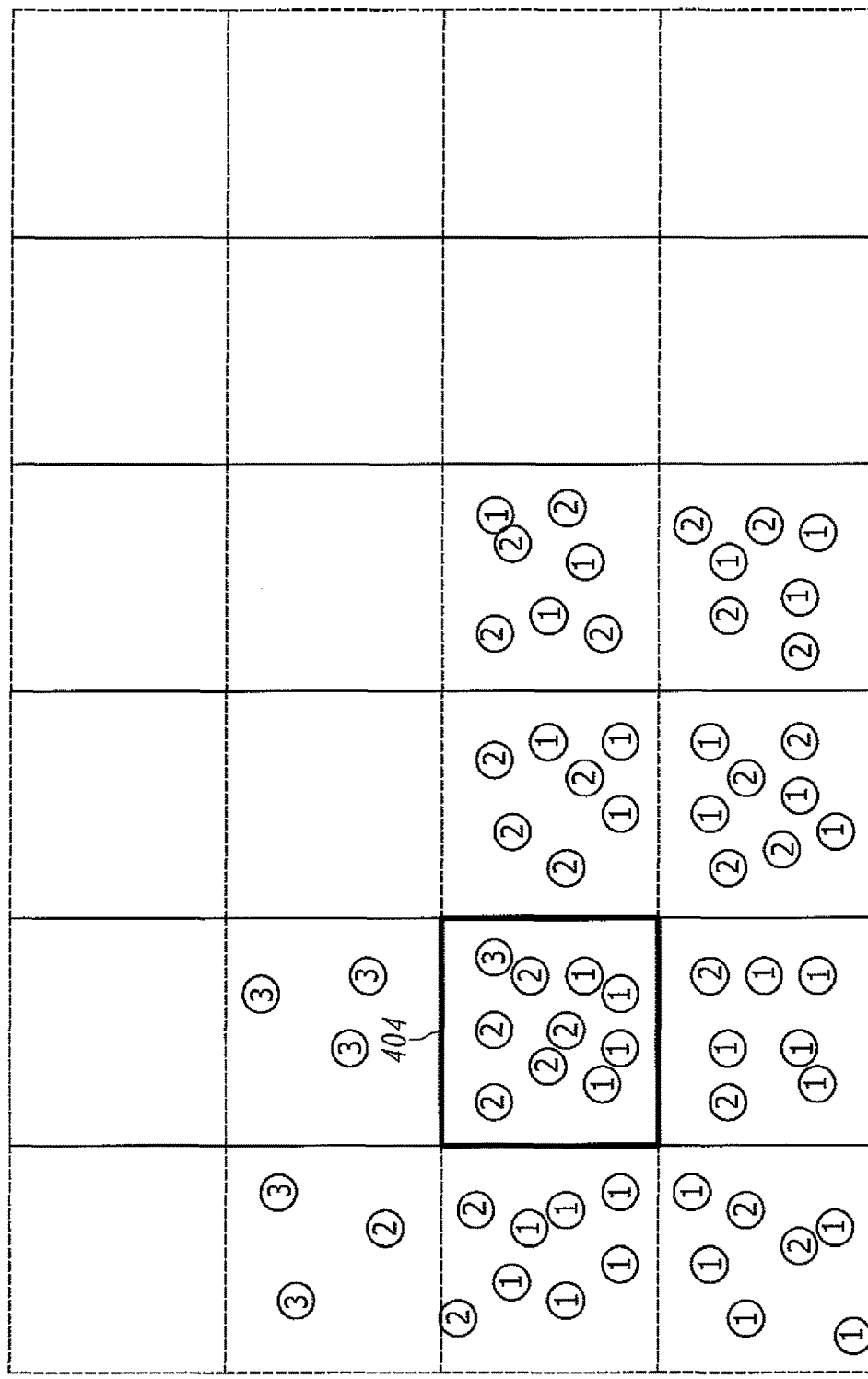
FIG. 4 depicts a segmented loaded-container point cloud, in accordance with some embodiments.

FIG. 4 depicts a segmented loaded-container point cloud, in accordance with some embodiments. In particular, FIG. 4 depicts a segmented 3D point cloud 402, which may be generated in a number of different ways, such as edge-based segmentation, surfaced-based segmentation, and/or scan-line-based segmentation, among numerous other possibilities that may be listed here. Moreover, it is noted that FIG. 4 depicts the segmented point cloud 402 after any necessary rotations and/or projections were performed to account for the relative positions and alignments of the depth sensor and the open end of the shipping container.

As described above, in at least one embodiment, the point cloud 402 is segmented among a plurality of grid elements, which collectively form a 2D grid image that corresponds to a plane that is parallel to the open end of the shipping container. Each grid element has a respective grid-element area. In FIG. 4, the grid elements are shown as being substantially square (e.g., 5 mm by 5 mm), though this is by way of example and not limitation, as any suitable dimensions and/or shapes could be used as deemed suitable by those of skill in the art for a given implementation. Moreover, in some embodiments, the side length of the grid elements is an adjustable parameter. In some cases, this parameter is set to be as small a value as the associated depth sensor allows and/or is capable of. Indeed, the resolution of the depth sensor plays a role in whether estimates of container fullness are overestimates or underestimates. As can be seen in FIG. 4, one example grid element 404 is highlighted by way of example. The grid element 404 is depicted as including ten total points from the segmented point cloud 402; four of those ten points have a depth value of 1 (e.g., 1 meter), five of those ten points have a depth value of 2 (e.g., 2 meters), and one of those ten points has a depth value of 3 (e.g., 3 meters). This number of points in grid element 404 and these respective depth values are provided purely by way of example and for illustration, and in no way for limitation.

Figure 5:
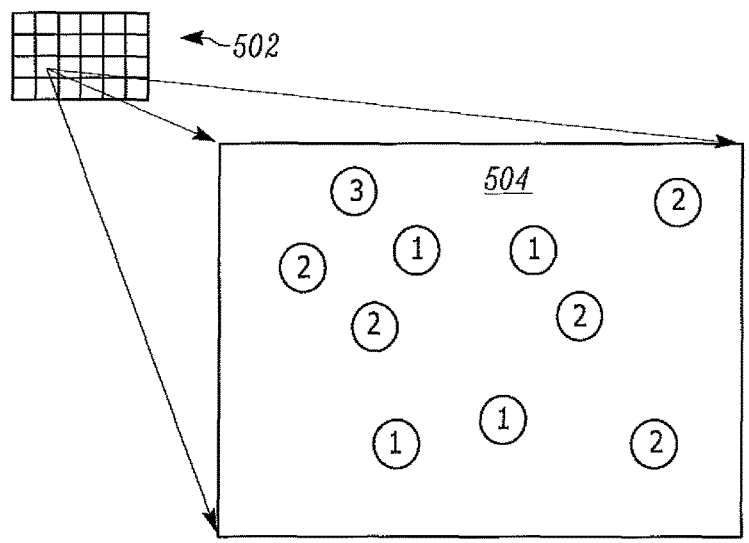
FIG. 5 depicts an expanded-grid-element view of a segmented loaded-container point cloud, in accordance with some embodiments.

FIG. 5 depicts an expanded-grid-element view of a segmented loaded-container point cloud, in accordance with some embodiments. In particular, FIG. 5 depicts a segmented 3D point cloud 502 (though zoomed out too far to depict individual points) and an expanded grid element 504. The expanded grid element 504 includes, by way of example only, the same set of ten points that are in the grid element 404 of FIG. 4, albeit in a different arrangement; i.e., there are ten total points, including four points having a depth value of 1, five points having a depth value of 2, and one point having a depth value of 3.

In connection with various embodiments, the grid element 504 is assigned a characteristic depth value based on the depth values of the points in the subsection of the 3D point cloud that is found in the particular grid element 504. From among those depth values, the characteristic depth value for the grid element could be a minimum value, a mode (i.e., most commonly occurring) value, an average value, or some other possibility. Using the example data that is present in FIG. 5: if the minimum value were used, then the characteristic depth value for the grid element 504 would be 1; if the mode value were used, then the characteristic depth value for the grid element 504 would be 2; if the average value were used, then the characteristic depth value for the grid element 504 would be 1.7 (or 2 if rounded to the nearest whole number). And certainly numerous other possible implementations could be listed here. As is described more fully below, the characteristic depth value that is assigned to a given grid element is then used, along with the area of that grid element, to calculate a loaded-portion volume for that particular grid element.

Figure 6:
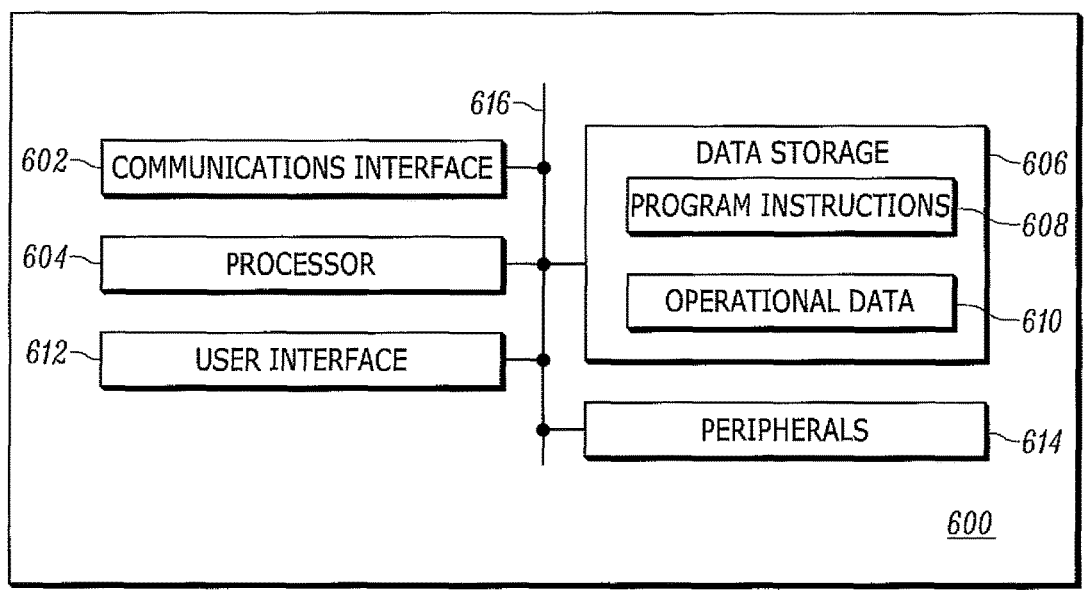
FIG. 6 depicts an architectural view of an example computing device, in accordance with some embodiments.

FIG. 6 depicts an architectural view of an example computing device, in accordance with some embodiments. The example computing device 600 may be configured to carry out the functions described herein, and as depicted includes a communications interface 602, a processor 604, data storage 606 (that contains program instructions 608 and operational data 610), a user interface 612, peripherals 614, and a communication bus 616. This arrangement is presented by way of example and not limitation, as other example arrangements could be described here.

The communication interface 602 may be configured to be operable for communication according to one or more wireless-communication protocols, some examples of which include LMR, LTE, APCO P25, ETSI DMR, TETRA, Wi-Fi, Bluetooth, and the like. The communication interface 602 may also or instead include one or more wired-communication interfaces (for communication according to, e.g., Ethernet, USB, and/or one or more other protocols.) The communication interface 602 may include any necessary hardware (e.g., chipsets, antennas, Ethernet interfaces, etc.), any necessary firmware, and any necessary software for conducting one or more forms of communication with one or more other entities as described herein.

The processor 604 may include one or more processors of any type deemed suitable by those of skill in the relevant art, some examples including a general-purpose microprocessor and a dedicated digital signal processor (DSP).

The data storage 606 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 6, the data storage 606 contains program instructions 608 executable by the processor 604 for carrying out various functions described herein, and further is depicted as containing operational data 610, which may include any one or more data values stored by and/or accessed by the computing device in carrying out one or more of the functions described herein.

The user interface 612 may include one or more input devices (a.k.a. components and the like) and/or one or more output devices (a.k.a. components and the like.) With respect to input devices, the user interface 612 may include one or more touchscreens, buttons, switches, microphones, and the like. With respect to output devices, the user interface 612 may include one or more displays, speakers, light emitting diodes (LEDs), and the like. Moreover, one or more components (e.g., an interactive touchscreen and display) of the user interface 612 could provide both user-input and user-output functionality.

The peripherals 614 may include any computing device accessory, component, or the like, that is accessible to and useable by the computing device 600 during operation. In some embodiments, the peripherals 614 includes a depth sensor. In some embodiments, the peripherals 614 includes a camera for capturing digital video and/or still images. And certainly other example peripherals could be listed.

Figure 7:
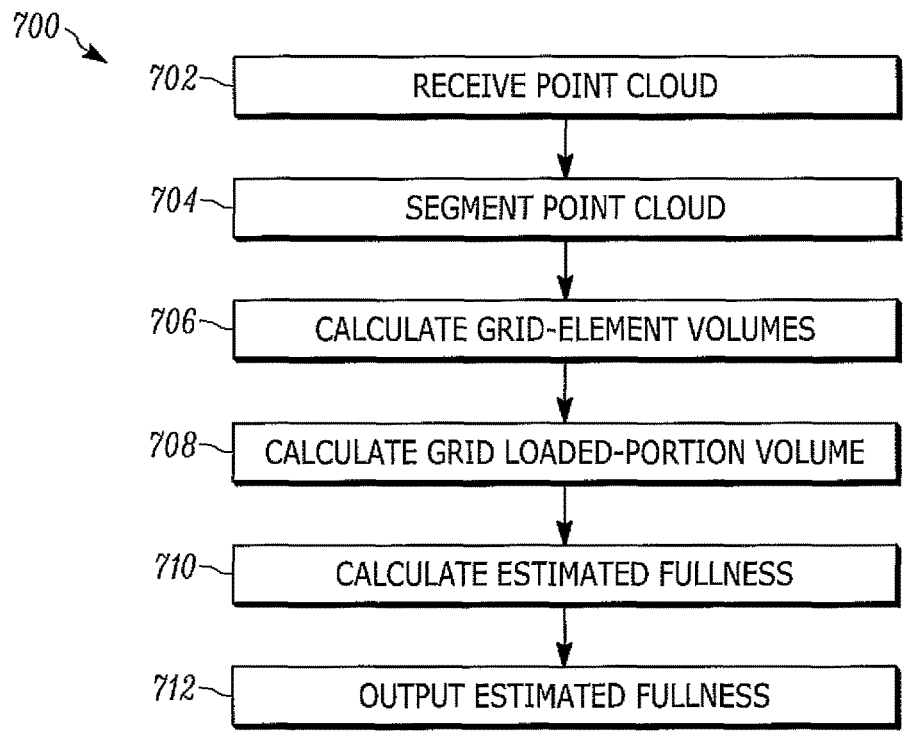
FIG. 7 depicts an example method, in accordance with some embodiments.

FIG. 7 depicts an example method, in accordance with some embodiments. In particular, FIG. 7 depicts a method 700 that includes steps 702, 704, 706, 708, 710, and 712, and is described below by way of example as being carried out by the computing system 600 of FIG. 6, though in general the method 700 could be carried out by any computing device that is suitably equipped, programmed, and configured.

At step 702, the computing system 600 receives a 3D point cloud from a depth sensor that is oriented towards an open end of a shipping container. The point cloud includes a plurality of points that each have a respective depth value. As described above, if necessary due to the respective positioning and alignment of the depth sensor and the open end of the shipping container, the computing system 600, upon receiving the 3D point cloud, may rotate the received 3D point cloud to align (i) an optical axis of the depth sensor with a ground level and (ii) an image plane of the depth sensor with an end plane of the shipping container. This rotating of the received point cloud may be based on a calibration process (e.g., an offline calibration process) that uses the ground level and the end plane as reference.

At step 704, the computing system 600 segments the 3D point cloud that was received at step 702 among a plurality of grid elements. As described above, those grid elements could be substantially rectangular (e.g., square) in shape, and they may collectively form a 2D grid image that corresponds to a plane that is parallel to the open end of the shipping container, where each grid element has a respective grid-element area.

At step 706, the computing system 600 calculates a respective loaded-container-portion grid-element volume for each grid element. The computing system 600 may do so by first determining a respective loaded-container-portion grid-element depth value for each grid element, and then determining each respective loaded-container-portion grid-element volume for each grid element by multiplying the particular grid element's area by the particular grid element's respective loaded-container-portion grid-element depth value. In some embodiments, the computing system 600 cleans up the 2D grid image prior to determining a respective loaded-container-portion grid-element depth value for each grid element.

As to how the computing system 600 may determine a particular grid element's respective loaded-container-portion grid-element depth value, in one embodiment the computing system 600 determines an unloaded-container-portion depth value for the particular grid element, and then determines the respective loaded-container-portion grid-element depth value for the particular grid element is based at least in part on the difference between (i) a depth dimension of the shipping container and (ii) the determined unloaded-container-portion depth value for the corresponding grid element. Thus, for example, if the computing system 600 determined that the unloaded-container-portion depth value of a given grid element was 3 meters and knew that the depth dimension of the shipping container was 50 meters, the computing system 600 could determine that the loaded-container-portion depth value for the given grid element was 47 meters.

As to how the computing system 600 may determine the unloaded-container-portion depth value for a given grid element, in some embodiments the computing system 600 assigns a characteristic grid-element depth value to the given grid element based on the depth values of the points in the point cloud that correspond to the given grid element. As described above, some options for doing so including selecting a minimum value, a mode value, and an average value. A maximum value could also be selected, those this would tend to lead to underloading of containers by overestimating their fullness, which would be less than optimally efficient.

Upon assigning a characteristic grid-element depth value to the given grid element, the computing system 600 may then determine the respective unloaded-container-portion depth value for the given grid element based at least in part on the difference between (i) the assigned characteristic grid-element depth value for the given grid element and (ii) an offset depth value corresponding to a depth between the 3D depth sensor and a front plane of the shipping container. Thus, if the depth sensor registers an absolute value of, e.g., 7 meters as a depth value for a given point or grid element and it is pre-provisioned or runtime determined that the depth sensor is 4 meters from the front plane of the open end of the shipping container, the computing system 600 may consider the unloaded-container-portion depth value for that grid element to be 3 meters. And certainly numerous other examples could be listed.

In some cases, the depth dimension of the shipping container that is used to derive a loaded-container-portion depth value from an unloaded-container-portion depth value for a given grid element is a grid-element-specific depth dimension that is based on a corresponding grid element in a reference empty-container point cloud. As described above, the back wall could be flat or curved, as depicted in FIGS. 2A and 2B, and the grid-element-specific depth dimension for a given grid element could accordingly reflect this. A reference point cloud could be gathered using an empty shipping container of the same type, and that reference point cloud could be stored in data storage and recalled, perhaps on a grid-element-by-grid-element basis to perform the herein-described calculations.

At step 708, the computing system 600 calculates a loaded-container-portion volume of the shipping container by aggregating the respective loaded-container-portion grid-element volumes that were calculated at step 706, giving a result that corresponds to what volume (in, e.g., cubic meters) of the shipping container has been loaded. It is noted that loaded in this context essentially means no longer available for loading. Thus, empty space that is now inaccessible due to packages being stacked in the way would be counted as loaded right along with space in the shipping container that is actually occupied by a given package.

At step 710, the computing system 600 calculates an estimated fullness of the shipping container based on (i) the loaded-container-portion volume that was calculated at step 708 and (ii) a capacity of the shipping container. In particular, the estimated fullness of the shipping container may be calculated as the loaded-portion volume of the shipping container divided by the capacity of the shipping container. The capacity of the shipping container could be determined in multiple different ways, some of which are described below in connection with FIG. 8.

In one embodiment, the computing system 600 determines the capacity of the shipping container based at least in part on the received 3D point cloud. Thus, the 3D point cloud may be indicative of the dimensions of the shipping container such that the capacity of the shipping container can be determined. In another embodiment, the computing system receives an optical image of the shipping container, and determines the capacity of the shipping container based at least in part on the received optical image. This could include determining actual dimensions of the shipping container from the optical image, and could instead or in addition include extracting an identifier of the shipping container from the optical image, perhaps using optical character recognition (OCR), and then querying a local or remote database using that identifier in order to retrieve dimension and/or capacity data pertaining to the particular shipping container.

It is noted that, in some embodiments, the system may determine that the entire interior of the shipping container is not visible to the depth sensor, perhaps due to the relative location and arrangement of the depth sensor and the shipping container. In such instances, the system may define a volume of interest (VOI) as being the part of the interior of the container that is visible to the depth sensor. The system may in some such instances calculate the estimated fullness of the container to be loaded portion of the VOI divided by the capacity (i.e., total volume) of the VOL In other embodiments, the system may simply assume that any internal portion of the shipping container that cannot be seen with the depth camera is loaded, and in such cases may still calculate the estimated fullness as the loaded portion of the entire shipping container divided by the total capacity of the entire shipping container. And certainly other example implementations could be listed here as well.

At step 712, the computing system 600 outputs the calculated estimated fullness of the shipping container, perhaps to a display, perhaps to a data storage, perhaps using wireless and/or wired communication to transmit the calculated estimated fullness of the shipping container to one or more other devices or systems, and/or perhaps to one or more other destinations.

Figure 8:
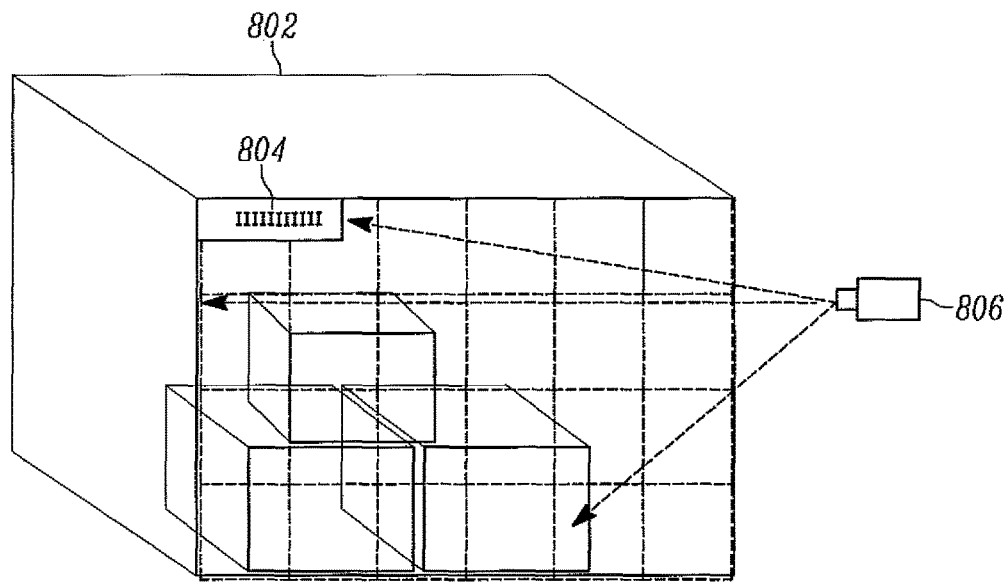
FIG. 8 depicts a shipping container having an optically readable identifier in accordance with some embodiments.

FIG. 8 depicts a shipping container having an optically readable identifier in accordance with some embodiments. In particular, FIG. 8 depicts a container 802, an indicia 804 (e.g., bar code or alphanumeric identifier), and an optical reader 806. There are several different types of optical readers 806 that may be used, such as a barcode scanner, a camera, and/or the like. In one embodiment, the optical reader 806 acquires an alphanumeric identifier of the container data using OCR. The computing system may then use that acquired alphanumeric identifier of the container to query a database for dimension data pertaining to the shipping container. And certainly other example implementations could be listed here as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
receiving a three-dimensional (3D) point cloud from a depth sensor that is oriented towards an open end of a shipping container, the point cloud comprising a plurality of points that each have a respective depth value;
segmenting the received 3D point cloud among a plurality of grid elements;
calculating a respective loaded-container-portion grid-element volume for each grid element based on at least a respective grid-element area and a respective loaded-container-portion grid-element depth value for each respective grid element that is determined based at least in part on the difference between (i) a depth dimension of the shipping container and (ii) an unloaded-container-portion depth value for the corresponding grid element;
calculating a loaded-container-portion volume of the shipping container by aggregating the calculated respective loaded-container-portion grid-element volumes;
calculating an estimated fullness of the shipping container based on the loaded-container-portion volume and a capacity of the shipping container; and
outputting the calculated estimated fullness of the shipping container.

2. The method of claim 1, wherein the plurality of grid elements collectively forms a two-dimensional (2D) grid image that corresponds to a plane that is parallel to the open end of the shipping container, each grid element having a respective grid-element area.

3. The method of claim 1, wherein determining the unloaded-container-portion depth value for a given grid element comprises:
assigning a grid-element depth value to the given grid element based on the depth values of the points in the point cloud that correspond to the given grid element; and
determining the unloaded-container-portion depth value for the given grid element based at least in part on the difference between (i) the assigned grid-element depth value for the given grid element and (ii) an offset depth value corresponding to a depth between the depth sensor and a front plane of the shipping container.

4. The method of claim 3, wherein assigning the grid-element depth value for the given grid element based on the depth values of the points in the point cloud that correspond to the given grid element comprises assigning as the grid-element depth value for the given grid element a minimum value from among the depth values of the points in the point cloud that correspond to the given grid element.

5. The method of claim 3, wherein assigning the grid-element depth value for the given grid element based on the depth values of the points in the point cloud that correspond to the given grid element comprises assigning as the grid-element depth value for the given grid element an average value of the depth values of the points in the point cloud that correspond to the given grid element.

6. The method of claim 1, wherein the depth dimension of the shipping container is a grid-element-specific depth dimension that is based on a corresponding grid element in a reference empty-container point cloud.

7. The method of claim 6, wherein the reference empty-container point cloud reflects a back wall of the shipping container being a flat surface.

8. The method of claim 6, wherein the reference empty-container point cloud reflects a back wall of the shipping container being a curved surface.

9. The method of claim 2, further comprising cleaning up the 2D grid image prior to determining a respective loaded-container-portion grid-element depth value for each grid element.

10. The method of claim 1, wherein the depth sensor has an optical axis and an image plane, the method further comprising:
prior to segmenting the received point cloud among the plurality of grid elements, rotating the received 3D point cloud to align (i) the optical axis with a ground level and (ii) the image plane with an end plane of the shipping container.

11. The method of claim 10, wherein the rotating the point cloud is based on an offline calibration process using the ground level and the end plane as reference.

12. The method of claim 1, further comprising determining the capacity of the shipping container based at least in part on the received 3D point cloud.

13. The method of claim 1, further comprising:
receiving an optical image of the shipping container; and
determining the capacity of the shipping container based at least in part on the received optical image.

14. The method of claim 13, wherein determining the capacity of the shipping container based at least in part on the received optical image comprises:
determining at least one physical dimension of the shipping container from the received optical image; and
determining the capacity of the shipping container based on the at least one determined physical dimension.

15. The method of claim 13, wherein determining the capacity of the shipping container based at least in part on the received optical image comprises:
using optical character recognition (OCR) on the at least one received optical image to ascertain at least one identifier of the shipping container; and using the at least one ascertained identifier of the shipping container to determine the capacity of the shipping container.

16. The method of claim 1, wherein each grid element has sides substantially equal to 5 millimeters (mm) in length.

17. The method of claim 1, wherein each grid element is substantially square in shape, and wherein a grid-element side length is an adjustable parameter.

18. A system comprising:
a depth sensor that is oriented towards an open end of a shipping container;
a communication interface;
a processor; and
data storage containing instructions executable by the processor for causing the system to carry out a set of functions, the set of functions including:
receiving a three-dimensional (3D) point cloud from the depth sensor, the point cloud comprising a plurality of points that each have a respective depth value;
segmenting the received 3D point cloud among a plurality of grid elements;
calculating a respective loaded-container-portion grid-element volume for each grid element based on at least a respective grid-element area and a respective loaded-container-portion grid-element depth value for each respective grid element that is determined based at least in part on the difference between (i) a depth dimension of the shipping container and (ii) an unloaded-container-portion depth value for the corresponding grid element;
calculating a loaded-container-portion volume of the shipping container by aggregating the calculated respective loaded-container-portion grid-element volumes;
calculating an estimated fullness of the shipping container based on the loaded-container-portion volume and a capacity of the shipping container; and
outputting the calculated estimated fullness of the shipping container.

19. The system of claim 18, wherein:
the plurality of grid elements collectively forms a two-dimensional (2D) grid image that corresponds to a plane that is parallel to the open end of the shipping container, each grid element having a respective grid-element area.

20. A method comprising:
receiving a three-dimensional (3D) point cloud from a depth sensor that is oriented towards an open end of a shipping container, the point cloud comprising a plurality of points that each have a respective depth value, wherein the depth sensor has an optical axis and an image plane;
rotating the received 3D point cloud to align (i) the optical axis with a ground level and (ii) the image plane with an end plane of the shipping container;
segmenting the rotated 3D point cloud among a plurality of grid elements that collectively form a two-dimensional (2D) grid image that corresponds to a plane that is parallel to the open end of the shipping container, each grid element having a respective grid-element area;
determining a respective loaded-container-portion grid-element depth value for each grid element at least in part by comparing (i) the respective portion of the projected point cloud that is overlaid by the respective grid-element area of the respective grid element with (ii) a respective corresponding portion of a reference empty-container point cloud;
calculating a respective loaded-container-portion grid-element volume for each grid element based on at least the respective grid-element area and the respective loaded-container-portion grid-element depth value for each respective grid element;
calculating a loaded-container-portion volume of the shipping container by aggregating the calculated respective loaded-container-portion grid-element volumes;
determining a capacity of the shipping container based at least in part on the received depth data
calculating an estimated fullness of the shipping container based on the loaded-container-portion volume and the determined capacity of the shipping container; and
outputting the calculated estimated fullness of the shipping container.

* * * * *